United States Patent
Rahman et al.

(10) Patent No.: US 10,649,753 B2
(45) Date of Patent: May 12, 2020

(54) ENABLING USER DEVICE APPLICATION MODULARITY

(71) Applicant: Verizon Patent and Licensing Inc., Arlington, VA (US)

(72) Inventors: Masudur Rahman, Somerset, NJ (US); Sonal Gandhi, Bridgewater, NJ (US); Bharadwaj Vemuri, Bear, DE (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

(21) Appl. No.: 15/378,674

(22) Filed: Dec. 14, 2016

(65) Prior Publication Data
US 2018/0165081 A1 Jun. 14, 2018

(51) Int. Cl.
*G06F 8/61* (2018.01)
*G06F 8/71* (2018.01)
*G06F 3/0482* (2013.01)

(52) U.S. Cl.
CPC .................. *G06F 8/61* (2013.01); *G06F 8/71* (2013.01); *G06F 3/0482* (2013.01)

(58) Field of Classification Search
CPC ............. G06F 8/61; G06F 8/71; G06F 3/0482
USPC ........................................................ 717/175
See application file for complete search history.

(56) References Cited

U.S. PATENT DOCUMENTS

| | | | | |
|---|---|---|---|---|
| 2005/0060392 A1* | 3/2005 | Goring | ...................... | G06F 8/65 709/220 |
| 2005/0120346 A1* | 6/2005 | Sprigg | ...................... | G06F 8/65 717/176 |
| 2007/0074205 A1* | 3/2007 | Tammana | ................. | G06F 8/61 717/177 |
| 2008/0086517 A1* | 4/2008 | Rodgers | .................. | G06F 21/57 |
| 2011/0265071 A1* | 10/2011 | He | ....................... | G06F 9/44536 717/168 |
| 2012/0227034 A1* | 9/2012 | Ibarra | ........................ | G06F 8/71 717/145 |
| 2013/0198720 A1* | 8/2013 | Maurice | .................... | G06F 8/64 717/122 |

(Continued)

OTHER PUBLICATIONS

Cadar et al, "Multi-version Software Updates", [Online], 2012, pp. 36-40, [Retrieved from internet on Jan. 6, 2020], <https://dl.acm.org/doi/pdf/10.5555/2664350.2664358?download=true> (Year: 2012).*

(Continued)

*Primary Examiner* — S. Sough
*Assistant Examiner* — Zengpu Wei

(57) ABSTRACT

A device can store a plurality of variants of an application. The device can receive, from a user device that is associated with a first variant of the application, a request for a second variant of the application. The first variant can include a first set of features and include a file size that is different than the second variant. The second variant can include a second set of features. The device can determine a first version identifier of the first variant of the application, and determine that a second version identifier associated with the second variant of the application is different than the first version identifier. The device can provide, to the user device, the second variant of the application to permit the user device to install the second variant of the application.

20 Claims, 14 Drawing Sheets

(56) References Cited

U.S. PATENT DOCUMENTS

| | | | |
|---|---|---|---|
| 2014/0237462 A1* | 8/2014 | Zheng | G06F 8/62 |
| | | | 717/170 |
| 2015/0128121 A1* | 5/2015 | Garcia | G06F 8/65 |
| | | | 717/170 |
| 2016/0132214 A1* | 5/2016 | Koushik | H04L 63/10 |
| | | | 715/741 |
| 2016/0357536 A1* | 12/2016 | Firlik | G06F 9/54 |
| 2017/0140451 A1* | 5/2017 | Firman | G06Q 30/0621 |
| 2017/0322934 A1* | 11/2017 | Chen | G06F 8/71 |
| 2018/0157674 A1* | 6/2018 | Gupta | G06F 16/1767 |
| 2019/0005239 A1* | 1/2019 | Park | G06F 21/563 |

OTHER PUBLICATIONS

Gokhale et al, "Multi-platform Strategies, Approaches and Challenges for developing Mobile applications", [Online], 2014, pp. 289-293, [Retrieved from internet on Jan. 6, 2020], <https://ieeexplore.ieee.org/stamp/stamp.jsp?tp=&arnumber=6839274> (Year: 2014).*

White et al, "Automating Product-Line Variant Selection for Mobile Devices", [Online], 2007, pp. 129-140, [Retrieved from internet on Jan. 6, 2020], <https://ieeexplore.ieee.org/stamp/stamp.jsp?tp=&arnumber=4339262> (Year: 2007).*

* cited by examiner

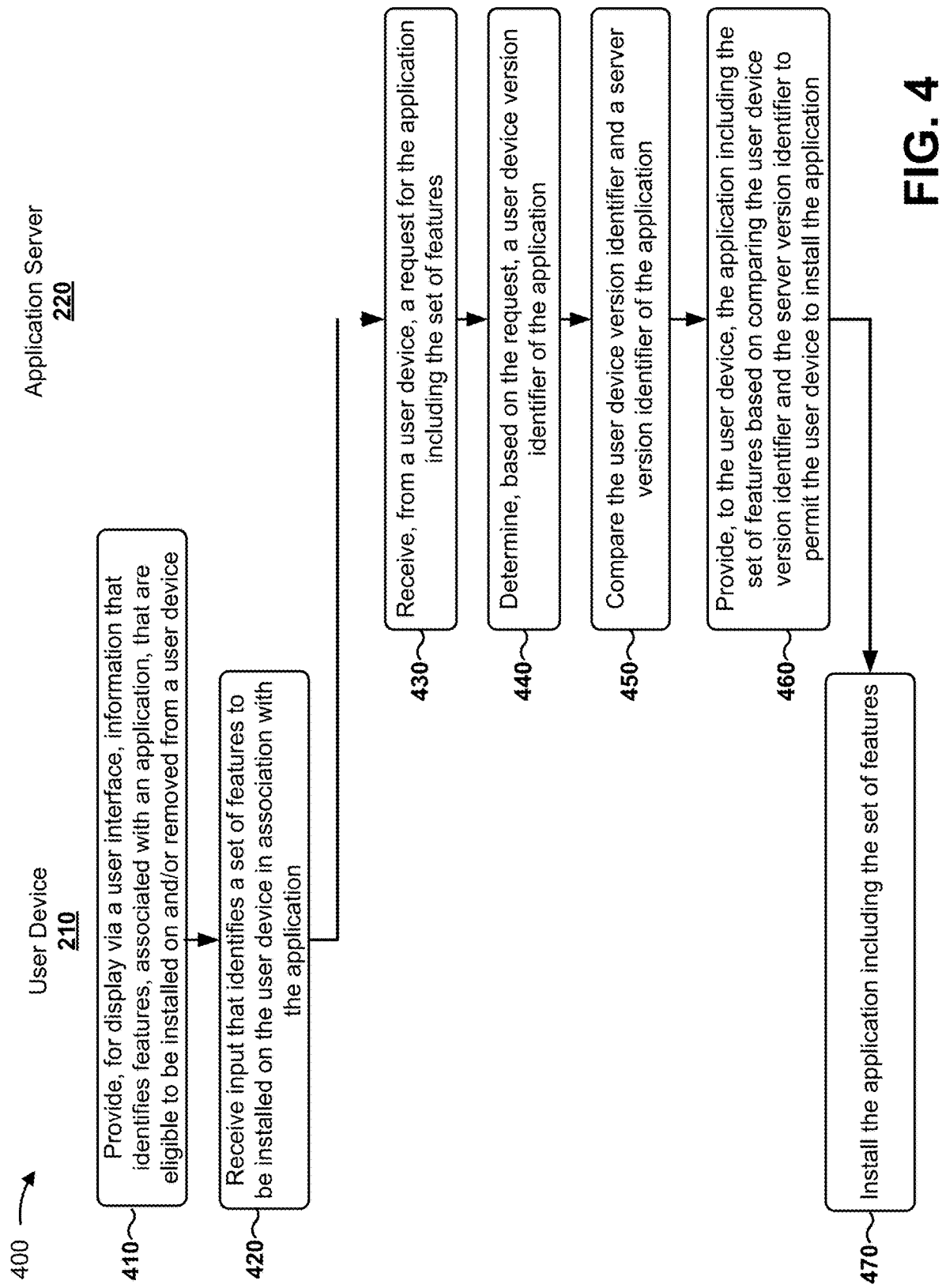

ENABLING USER DEVICE APPLICATION MODULARITY

BACKGROUND

A user device (e.g., a smartphone) can include multiple applications that provide particular functionality (e.g., Short Message Service (SMS) applications, image messaging applications, social media applications, gaming applications, etc.). A particular application can be associated with a file size based on files, code, resources, etc. associated with the application.

BRIEF DESCRIPTION OF THE DRAWINGS

FIG. 4 is a flow chart of an example process for enabling user device application modularity.

DETAILED DESCRIPTION OF PREFERRED EMBODIMENTS

The following detailed description of example implementations refers to the accompanying drawings. The same reference numbers in different drawings can identify the same or similar elements.

A user device can include numerous software applications that consume substantial memory resources of the user device (e.g., internal memory, storage, etc.). Such applications often have a large number of features, which can correspondingly require a large number of memory resources. A particular user can want to use only a small subset of such features, yet is nonetheless required to download the entire application, thereby causing the user device to store information associated with the entire application.

Furthermore, such applications are often frequently updated to add enhancements and/or additional features, thereby consuming even more memory resources. Still further, the large number and potentially confusing amount of features and functions available, potentially compounded by the frequent updates, can be overwhelming for a user who is not technically inclined, and/or has limited time to learn the functionality of the user device.

Additionally, Original Equipment Manufacturers (OEMs) and/or carriers can wish to pre-load applications on the user device. Such pre-loaded applications can add value, generate revenue, retain customers, or the like. However, limited available memory resources and/or a large number of application features can prevent these objectives from being realized. That is, an OEM can be prevented from pre-loading particular applications on a user device due to user device resource constraints.

Implementations described herein provide a modular application design in which an application including a subset of features and/or functions (requiring only limited memory resources) is installed on the user device. Additionally, implementations described herein enable the user device to selectively update the application to include particular features and/or functions desired and selected by the user, without having to download the entire application (e.g., a variant of the application including all potentially available features and/or functions that could be selected).

In this way, implementations described herein enable a user device to install an application that includes a set of features that more accurately aligns with a user preference (e.g., does not include undesired features, does not include features that are beyond an operating ability of the user, etc.). Additionally, in this way, implementations described herein conserve memory resources of the user device by storing an amount of information that corresponds to the selected features (e.g., does not include undesired features, etc.). As a result, a file size of the application can be reduced based on the amount of selected features, thereby conserving memory resources of the user device.

Figure 1A:
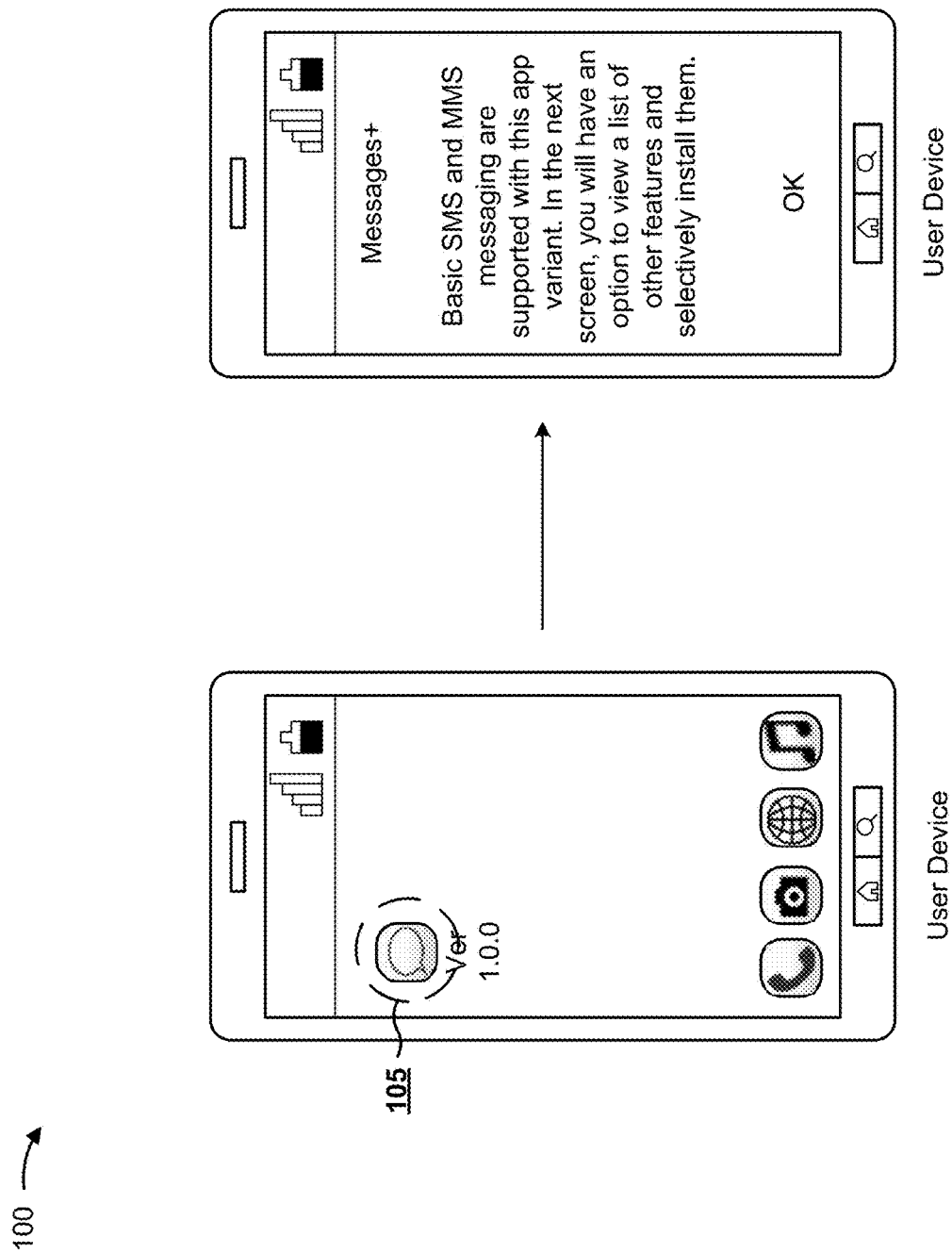
FIGS. 1A-1H are diagrams of an overview of an example implementation described herein.

FIGS. 1A-1H are diagrams of an overview of an example implementation 100 described herein. As shown in FIG. 1A, example implementation 100 can include a user device. As shown by reference number 105, the user device can receive input (e.g., based on a user performing a touch gesture, such as a tap) that causes the user device to execute an application. As shown in FIG. 1A, the user device can provide, for display via the user interface, information that identifies that the application enables the user to select particular features of the application.

Figure 1B:
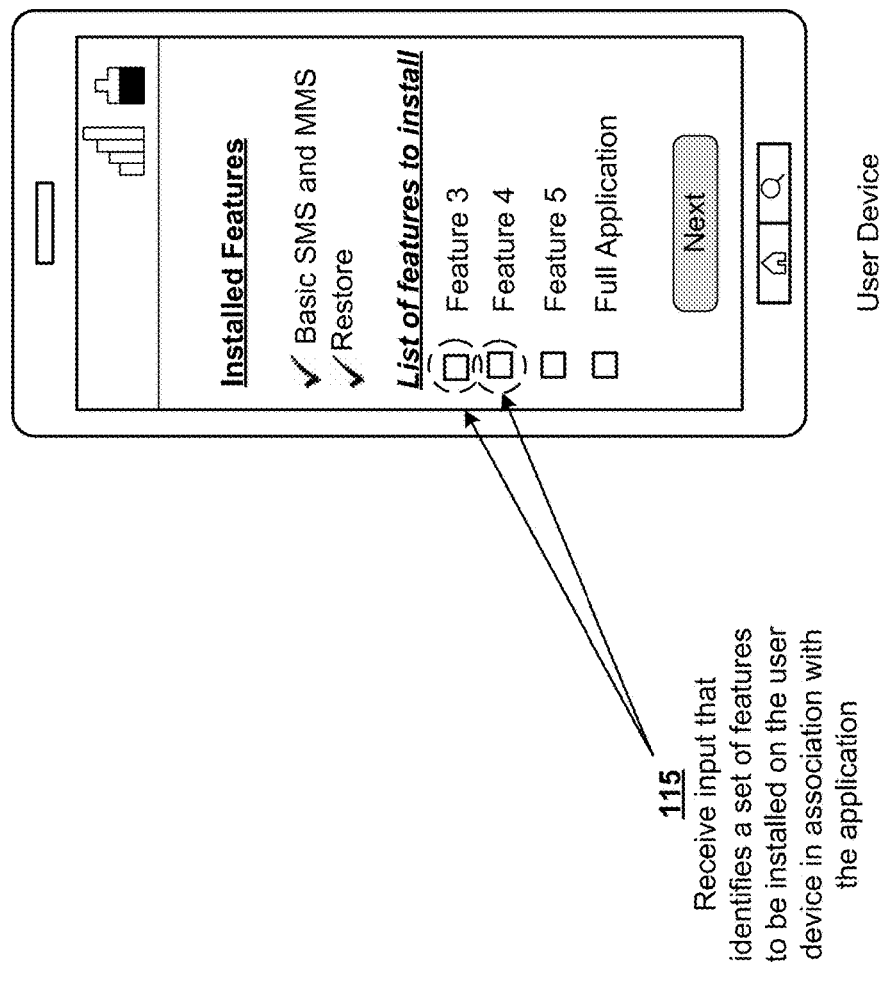

As shown in FIG. 1B, and by reference number 110, the user device can provide, for display via a user interface, information that identifies features, associated with the application, that are eligible to be installed on and/or removed from the user device. As shown by reference number 115, the user device can receive input that identifies a set of features to be installed on the user device in association with the application. For example, the user can interact with the user device to select particular features to be installed or removed in association with the application (e.g., via a menu, a check box, a list, or the like). As shown in FIG. 1B, the user device can provide, for display via the user interface, information that identifies features that are currently installed on the user device, and information that identifies features that are eligible to be installed on the user device. At a time of the user selection, the features that are eligible to be installed on the user device do not consume user device resources.

Figure 1C:
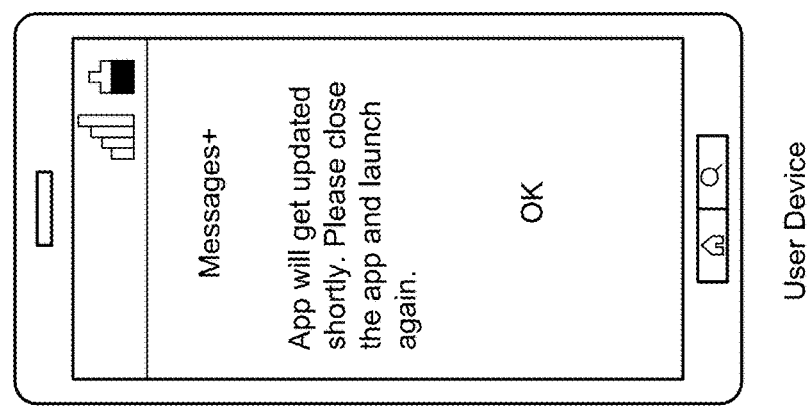

As shown in FIG. 1C, the user device can provide, for display via the user interface, information that identifies that the application is being updated (e.g., the selected features are being installed). Additionally, as shown, the user device can provide, for display via the user interface, information that identifies an instruction for the user to exit the application, and launch the application at a later time.

Figure 1D:
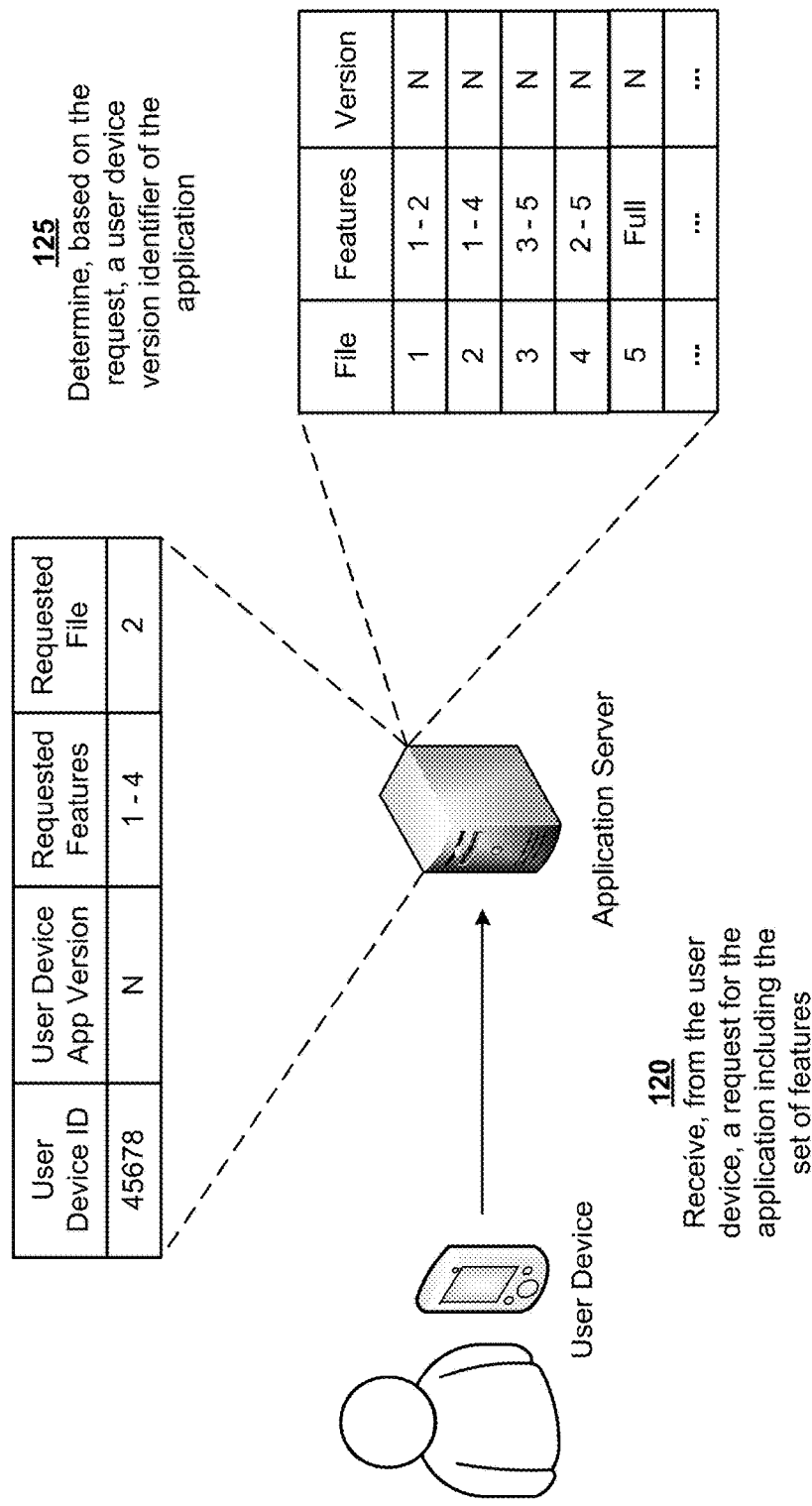

As shown in FIG. 1D, example implementation 100 can further include an application server. As shown by reference number 120, the application server can receive, from the user device, a request for the application including the set of features. As shown, the request can include information that identifies a device identifier (e.g., shown as "45678"), a user device version identifier of the application (e.g., shown as "version N"), and/or information identifying the requested set of features (e.g., features 1-4).

In some implementations, the application server can determine, based on information that maps archive files and sets of features, an archive file associated with the requested set of features. For example, an archive file can store an application (e.g., executable files, resource files, or the like). As shown, the application server can store particular archive files that correspond to particular variants of the application. For example, archive file 2 can correspond to a set of files that correspond to features 1-4.

As shown by reference number 125, the application server can determine, based on the request, a user device version identifier of the application. For example, the user device version identifier can refer to information that identifies a version of the application that is installed on the user device.

Figure 1E:
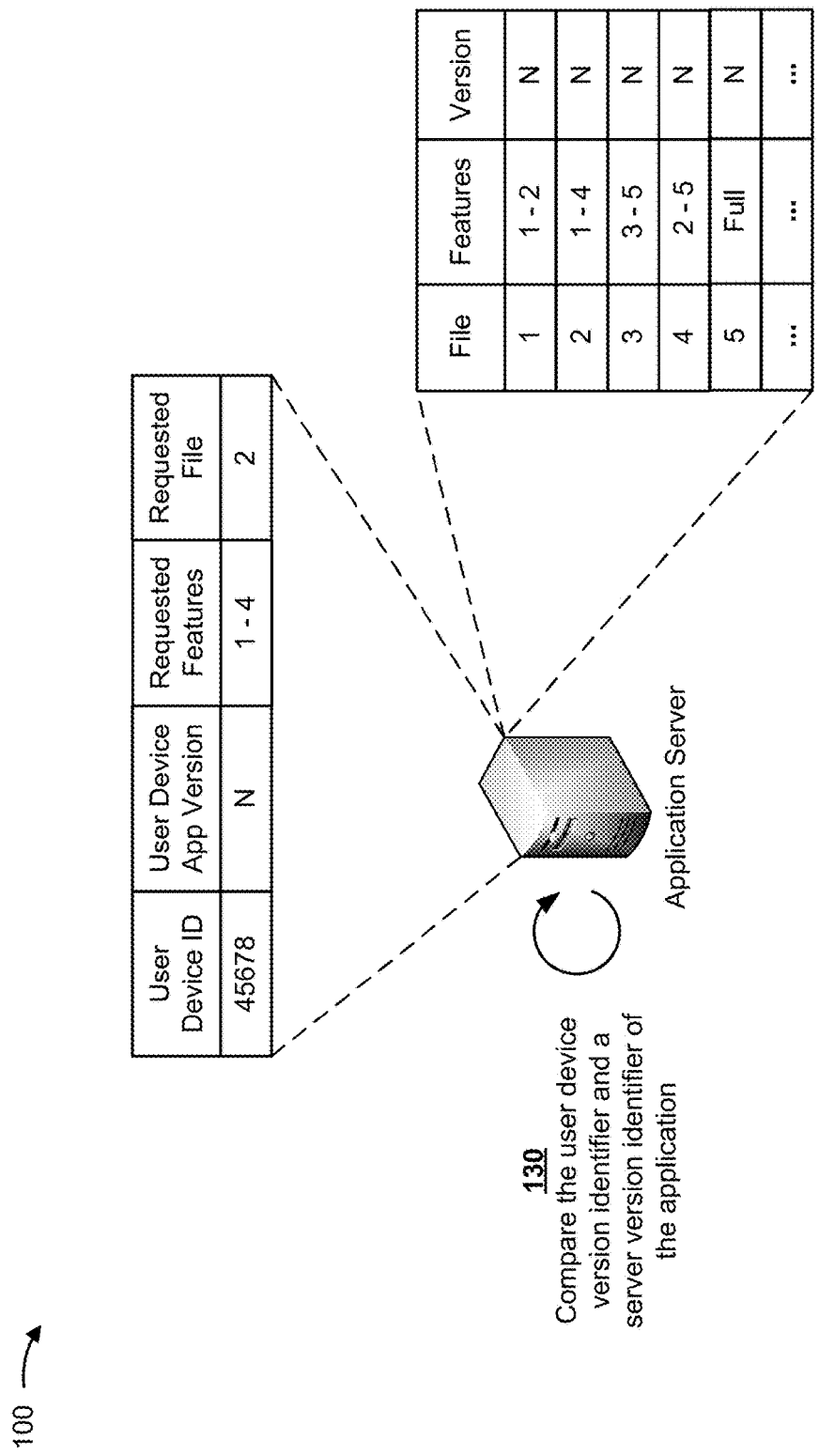

As shown in FIG. 1E, and by reference number 130, the application server can compare the user device version identifier and a server version identifier of the application. For example, the server version identifier of the application can refer to information that identifies a version of the application that is stored by the application server. If the application server determines that the application, that is installed on the user device, is more recent, more recently updated, etc., than as compared to the application that is stored by application server, then the application server can adjust the server version identifier to prevent an installation error.

Figure 1F:
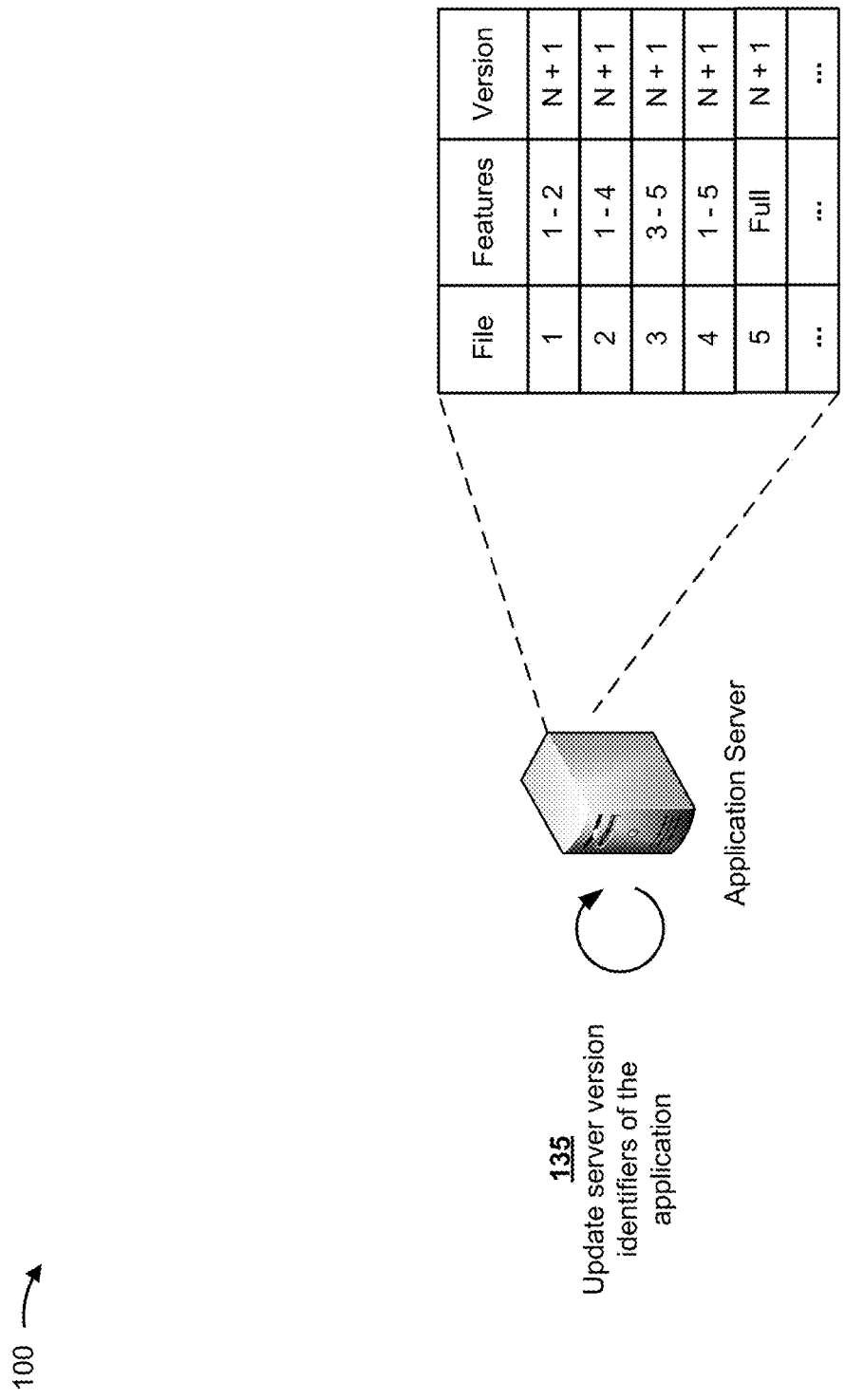

As shown in FIG. 1F, and as shown by reference number 135, the application server can update server version identifiers of the application. For example, the application server can increment the server version identifier for file 2 from "N" to "N+1" (e.g., thereby identifying that the application, that is stored by the application server, is more recent, more recently updated, etc. than as compared to the application that is installed on the user device). Additionally, the application server can update server version identifiers for other archive files based on adjusting the server version identifier of the archive file associated with the selected set of features (e.g., to prevent installation errors, to reduce download latency, or the like). For example, the application server can receive, from another user device (or the user device) another request for the application, and provide the application to the other user device without having to increment the server version identifier of the application. In this way, the application server can reduce a download latency associated with download of the application, prevent installation errors (e.g., based on version control issues), or the like.

Figure 1G:
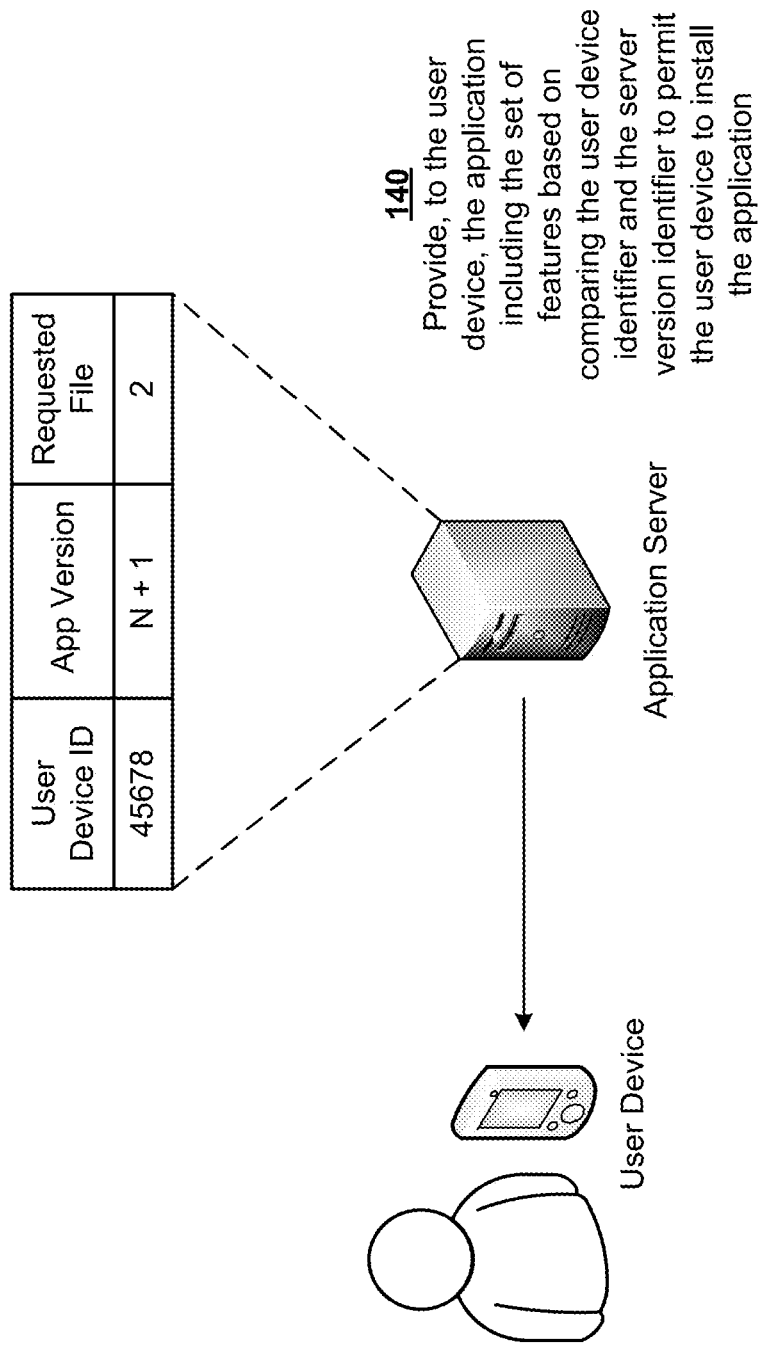

As shown in FIG. 1G, and by reference number 140, the application server can provide, to the user device, the application including the set of features based on comparing the user device version identifier and the server version identifier to permit the user device to install the application. For example, the application server can provide an archive file (e.g., file 2) that includes a set of one or more files that correspond to an application with the features selected by the user.

Figure 1H:
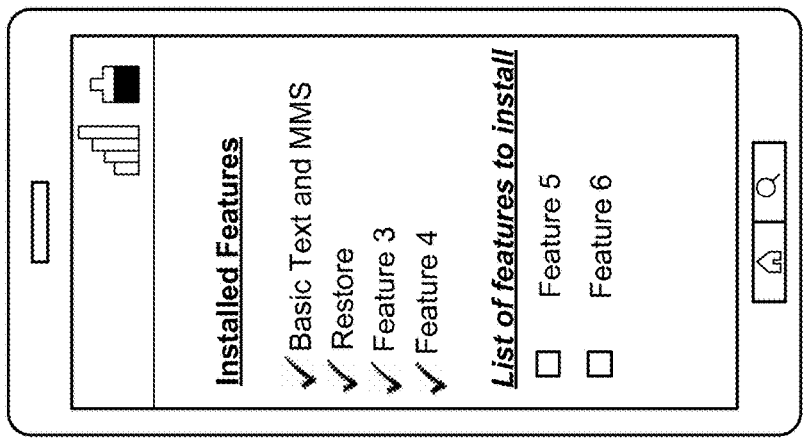

As shown in FIG. 1H, and by reference number 145, the user device can install the application including the set of features. Additionally, the user device can remove the previous variant of the application that was installed on the user device. As shown in FIG. 1H, the user device can provide, for display, information that identifies installed features of the application, information that identifies that the requested features were successfully installed, or the like.

In this way, the user device can dynamically add and/or remove features of an application based on the user requesting the application to include particular sets of features. Additionally, in this way, the user device can iteratively install particular variants of the same application that are associated with varying file sizes based on particular sets of features of the application. Additionally, in this way, the application can consume user device memory resources based on the particular sets of features.

In this way, the user device enables a user device can install an application that includes a set of features that more accurately aligns with a user preference (e.g., does not include undesired features, does not include features that are beyond an operating ability of the user, etc.) and/or that meets a storage capability of the user device (e.g., includes features that keep the file size of the application below a threshold size). Additionally, in this way, the user device can conserve memory resources by storing an amount of information that corresponds to the selected features rather than storing an entire application that includes undesired features. As a result, in cases where the user requests a subset of available features, the file size of the application is reduced based on the amount of selected features, thereby conserving processor and/or memory resources of the user device.

As indicated above, FIGS. 1A-1H are provided merely as an example. Other examples are possible and can differ from what was described with regard to FIGS. 1A-1H.

Figure 2:
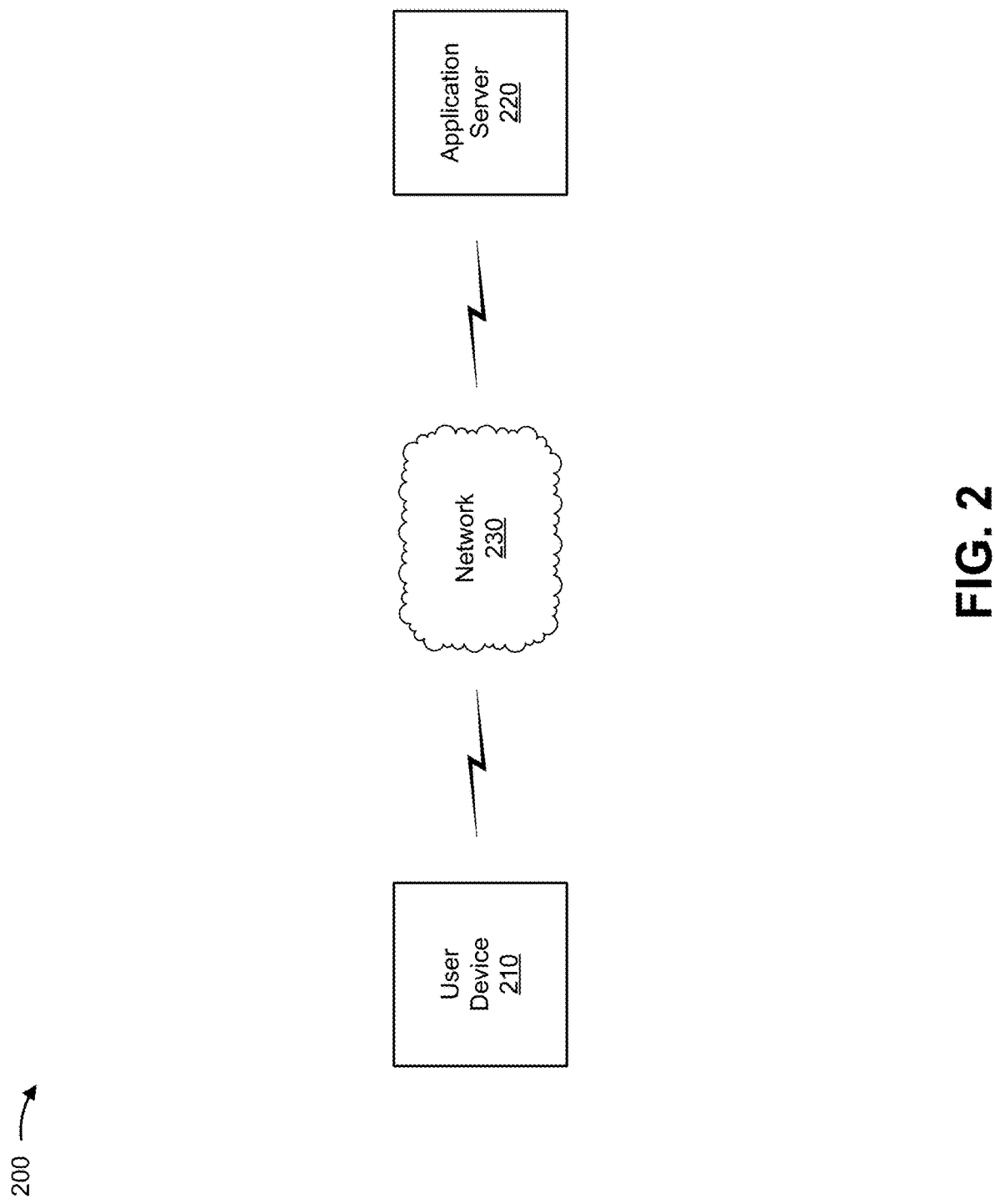
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, an application server 220, and a network 230. Devices of environment 200 can interconnect via wired connections, wireless connections, or a combination of wired and wireless connections.

User device 210 includes one or more devices capable of receiving, generating, storing, processing, and/or providing information associated with an application. For example, user device 210 can include a communication and/or computing device, such as a mobile phone (e.g., a smart phone or a radiotelephone), a desktop computer, a laptop computer, a tablet computer, a handheld computer, a gaming device, a wearable communication device (e.g., a smart wristwatch or a pair of smart eyeglasses), or a similar type of device.

Application server 220 includes one or more devices capable of receiving, processing, storing, and/or providing information associated with an application. For example, application server 220 can include a computing device, such as a server (e.g., an application server, a cloud server, a host server, a web server, a hypertext transfer protocol (HTTP) server, etc.), a network device, or a similar device.

Network 230 includes one or more wired and/or wireless networks. For example, network 230 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
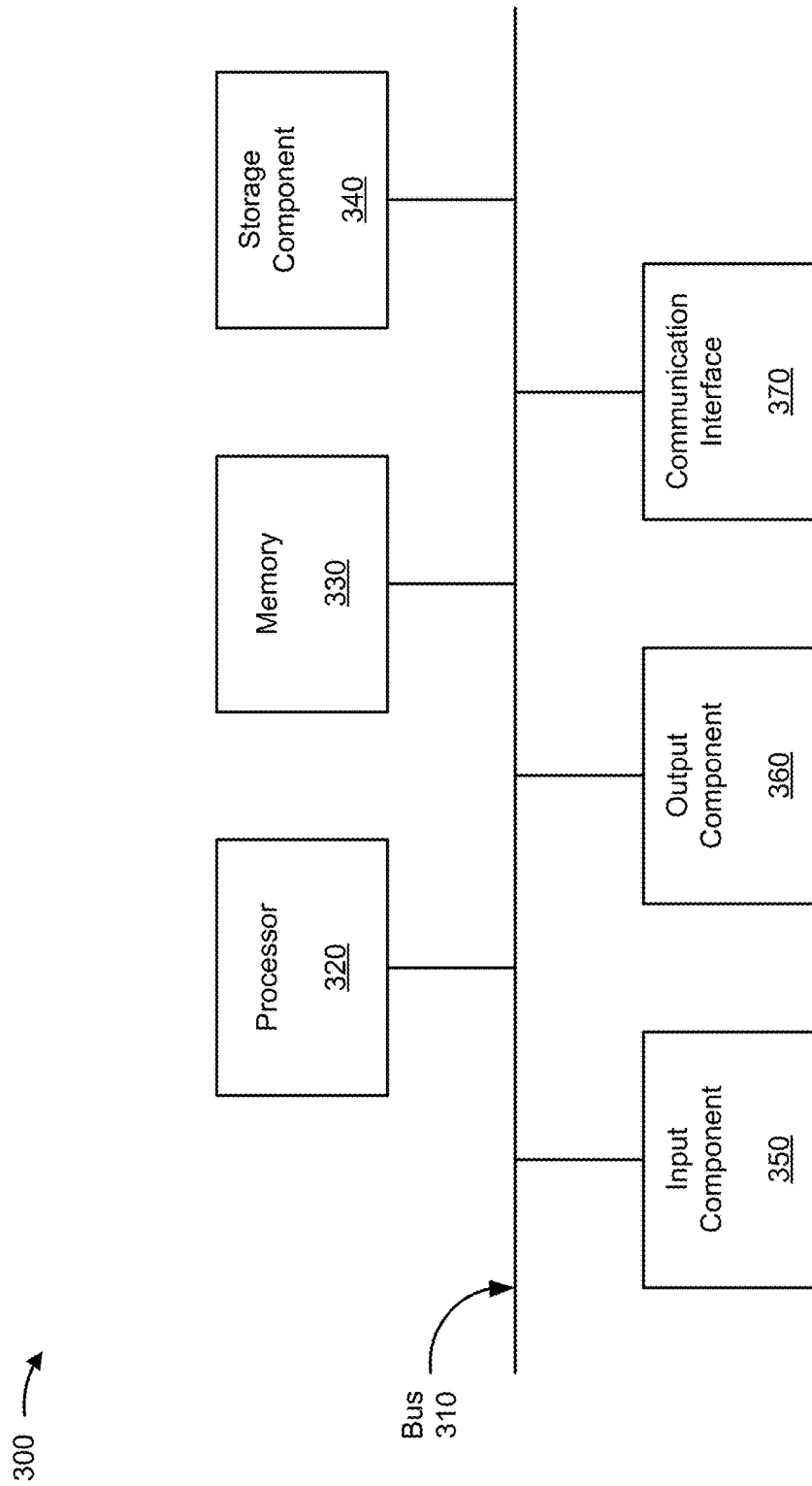
FIG. 3 is a diagram of example components of one or more devices of FIG. 2.

FIG. 3 is a diagram of example components of a device 300. Device 300 can correspond to user device 210 and/or application server 220. In some implementations, user device 210 and/or application server 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for enabling user device application modularity. In some implementations, one or more process blocks of FIG. 4 can be performed by user device 210 and/or application server 220.

As shown in FIG. 4, process 400 can include providing, for display via a user interface, information that identifies features, associated with an application, that are eligible to be installed on and/or removed from a user device (block 410), and receiving input that identifies a set of features to be installed on the user device in association with the application (block 420). For example, user device 210 can provide, for display via a user interface, information that identifies features, associated with an application, that are eligible to be installed on and/or removed from user device 210. Additionally, user device 210 can receive input that identifies a set of features to be installed on the user device in association with the application.

In some implementations, user device 210 can store an application that enables selective installation of particular features. For example, user device 210 can store a file that includes the application (e.g., an archive file, such as an ".apk" file, an ".ipa" file, or the like, that includes a set of files associated with the application). While implementations herein describe applications associated with particular operating systems (e.g., Android or iOS) and/or file types, other implementations can include applications associated with other operating systems, file types, and/or sets of files.

In some implementations, the archive file can include a manifest file, a set of executable files, a set of resource files, a set of configuration files, or the like. In some implementations, the manifest file can include information that identifies the application (e.g., an application identifier), information that identifies a version of the application that is installed on user device 210 (e.g., a user device version identifier), and/or the like.

In some implementations, a feature can refer to a functionality, a service, a user interface, or the like, that is capable of being provided by the application. For example, particular features can provide particular functionalities, services, user experiences, user interfaces, or the like. In some implementations, different features can include different executable files, different resource files, and/or different combinations of files that enable different functionalities of the application.

In some implementations, a file size of the application can depend on the amount of features that are installed in association with the application. For example, a first variant of the application can include a first set of features, and a second variant of the application can include a second set of features. In this case, the first variant can include more features, less features, a different combination of features, more robust features, less robust features, or the like, as compared to the second variant.

In some implementations, particular variants of the application can include varying file sizes based on the amount of features (and/or the particular features) that are installed in association with the particular variants (e.g., based on files, code, resources, or the like, associated with the particular variants). In this way, user devices 210 can include different variants of the same underlying application based on respective sets of features that are installed. Additionally, in this way, different variants of the application can consume varying amounts of user device 210 memory resources.

In some implementations, user device 210 can provide, for display via a user interface, information that enables a user to select particular features to be installed on or removed from user device 210. For example, if user device 210 already has the application stored, then user device 210 can provide, for display via a user interface, information that identifies particular features that are already installed, particular features that are eligible to be installed, particular features that are eligible to be removed, or the like. As an example, an entity (e.g., a device manufacturer, a carrier, a network service provider, etc.) can cause the application to be installed on user device 210 and/or particular features to be installed in association with the application (e.g., pre-loaded). In this case, a user of user device 210 can want to add additional features, remove particular features, select other features, or the like.

In some implementations, if user device 210 does not have the application stored, then user device 210 can provide, for display via a user interface, information that identifies particular features that are eligible to be installed in association with the application.

In some implementations, user device 210 can receive input that identifies a set of features to be installed in association with the application. For example, a user of user device 210 can interact with user device 210 to select particular features to be installed or removed (e.g., via a menu, a check box, a list, or the like). In some implementations, user device 210 can determine, based on the user interaction, the set of features to be installed in association with the application. Additionally, user device 210 can provide, to application server 220, information that identifies the set of features.

As further shown in FIG. 4, process 400 can include receiving, from a user device, a request for the application including the set of features (block 430). For example, application server 220 can receive, from user device 210, a request for the application including the set of features.

In some implementations, the request for the application can include information associated with user device 210 and/or the application that is installed on user device 210. For example, the request can include a device identifier of user device 210, such as a mobile directory number (MDN), an International Mobile Equipment Identity (IMEI), or the like. Additionally, or alternatively, the request for the application can include information that identifies a device type (e.g., a device model), a device version, an operating system type (e.g., Android, iOS, or the like), an operating system version, a user interface type, a user interface version, or the like.

Additionally, or alternatively, the request for the application can include information that identifies a user device version identifier of the application that is installed on user device 210. For example, the user device version identifier can include a version identifier of the application that is installed on user device 210. Additionally, or alternatively, the request for the application can include information that identifies the set of features (e.g., a feature identifier, a set of feature identifiers, an identifier of the set of features, a file identifier, or the like).

As further shown in FIG. 4, process 400 can include determining, based on the request, a user device version identifier of the application (block 440), and comparing the user device version identifier and a server version identifier of the application (block 450). For example, application server 220 can determine, based on the request, a user device version identifier of the application, and compare the user device version identifier and a server version identifier of the application. In some implementations, the server version identifier can identify a version of the application that is stored and/or is accessible by application server 220 (e.g., is capable of being caused to be provided to user device 210 by application server 220).

In some implementations, application server 220 can store multiple variants of the application that include various sets of features. For example, application server 220 can store particular archive files that correspond to particular variants of the application. As a particular example, a first archive file can include a first set of files that correspond to a first set of features, and a second archive file can include a second set of files that correspond to a second set of features.

In some implementations, each archive file can include information that identifies the same application identifier (e.g., respective manifest files can include information that identifies the same application identifier). In this way, application server 220 can enable user device 210 to iteratively install different variants of the same underlying application based on the application identifier. That is, user device 210 can receive an archive file, determine the application identifier based on the archive file, and update the application based on the application identifier (e.g., delete previously stored files associated with the application and install files associated with the received archive file).

In some implementations, application server 220 can identify a particular archive file based on the request (e.g., based on information that identifies the set of features to be installed). For example, application server 220 can store information that maps a set of features to an archive file. Additionally, or alternatively, application server 220 can identify an archive file that is associated with the set of features, and determine a server version identifier of the application based on the archive file.

In some implementations, application server 220 can compare the user device version identifier and the server version identifier, and determine that the server version identifier is different than the user device version identifier. For example, application server 220 can determine that the server version identifier is greater than the user device version identifier. Additionally, or alternatively, the server version identifier can be indicative of the application, that is stored by application server 220, being more recent than as compared to the application that is installed on user device 210 (e.g., a more recent version, more recently updated, or the like). In this case, and as described elsewhere herein, application server 220 can provide, to user device 210, the application including the set of features (e.g., the archive file) without adjusting the server version identifier. In this way, user device 210 can receive the application, and install the application based on the server version identifier being different than the user device version identifier.

In some implementations, application server 220 can compare the user device version identifier and the server version identifier, and determine that the user device version identifier and the server version identifier are the same. Additionally, or alternatively, application server 220 can determine that the server version identifier is indicative of the application, that is stored by application server 220, being less recent than the application installed on user device 210 (e.g., a previous version, updated less recently, or the like). As an example, and in cases where a larger number is indicative of a more current application version, application server 220 can determine that the user device version identifier is greater than or equal to the server version identifier. In this case, application server 220 can adjust (e.g., increment) the server version identifier to prevent an installation error (e.g., user device 210 can prevent an installation of the application that is associated with a version identifier that is less than or equal to a version identifier of an installed application).

In some implementations, application server 220 can un-compress the archive file, and identify a set of files associated with the application. As an example, in a case where the application is configured for the Android operating system, application server 220 can identify a set of compiled files, such as an extensible markup language (.XML) manifest file, Dalvik Executable (.DEX) files, Android compiled resource (.arsc) files, and/or other files.

In some implementations, application server 220 can decompile the manifest file to identify source code associated with the manifest file, parse the source code, identify a version identifier of the application, and adjust the version identifier of the application. For example, application server 220 can adjust the version identifier of the application such that the version identifier is greater than the user device version identifier of the application, is indicative of the application being more recent than a version of the application that is installed on user device 210, or the like.

In some implementations, application server 220 can compile the set of files based on adjusting the version identifier, and compress the set of compiled files to generate an archive file. In this way, user device 210 can receive the application that includes a version identifier that is different (e.g., is indicative of a more recent version) than the user device version identifier of the application, and install the application. In this way, implementations described herein can reduce a number of installation errors of the application, thereby conserving processor and/or memory resources of user device 210 and/or application server 220, and/or conserving network resources.

In some implementations, application server 220 can adjust server version identifiers associated with other archive files that are associated with the application based on adjusting the server version identifier of the archive file associated with the set of features. For example, application server 220 can adjust server version identifiers, of other archive files, in a similar manner as described above. In this way, application server 220 can decrease a download time of the application for other user devices 210 (and/or user device 210). For example, another user device 210 can request the application, and application server 220 can provide the application to the other user device 210 without having to first adjust the server version identifier of the application. In this way, implementations described herein can conserve user device 210 processor, memory, and/or battery resources, and/or can conserve network resources by reducing a download latency and/or time.

As further shown in FIG. 4, process 400 can include providing, to the user device, the application including the set of features based on comparing the user device version identifier and the server version identifier to permit the user device to install the application (block 460). For example, application server 220 can provide, to user device 210, the application including the set of features based on comparing the user device version identifier and the server version identifier to permit the user device to install the application including the set of features.

In some implementations, application server 220 can provide the archive file that includes the set of files that correspond to the set of features. In this way, user device 210 can receive the application (e.g., the archive file), and install the application, as described below.

As further shown in FIG. 4, process 400 can include installing the application including the set of features (block 470). For example, user device 210 can install the application including the set of features. In some implementations, if user device 210 did not previously have the application installed, then user device 210 can install the application including the set of features. Additionally, or alternatively, if user device 210 includes a previously installed variant of the application, then user device 210 can receive the application including the set of features, identify the application identifier, and determine that the application including the set of features is the same application as the previously installed variant.

Additionally, in a case where user device 210 includes a previously installed variant of the application, user device 210 can compare the server version identifier and the user device version identifier, determine that the server version identifier is greater than the user device identifier, and install the application. In some implementations, user device 210 can uninstall the previously installed variant of the application before or after installing the application including the set of features. In some implementations, user device 210 can uninstall the previously installed variant of the application during the installation process for installing the application including the set of features. For example, the archive file, received from application server 220, can include an instruction for uninstalling the previously installed variant of the application.

In this way, user device 210 can dynamically add and/or remove features of an application based on requesting the application including particular sets of features from application server 220. Additionally, in this way, user device 210 can iteratively install particular variants of the same application that are associated with varying file sizes based on particular sets of features of the application. Additionally, in this way, the application can consume varying amounts of user device 210 memory resources based on the particular sets of features.

In this way, implementations described herein enable user device 210 to install an application that includes a set of features that more accurately aligns with a user preference and/or a user operating ability (e.g., does not include undesired features, does not include features that are beyond an operating ability of the user, etc.). Additionally, in this way, implementations described herein conserve memory resources of user device 210 by storing information that corresponds to the selected features rather than storing information associated with an entire application (e.g., including undesired, unselected, etc. features). Additionally, implementations described herein reduce operating errors associated with user device 210 by providing an application that more accurately aligns with a skill set or operating ability of the user, thereby conserving processor and/or memory resources of user device 210.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5A:
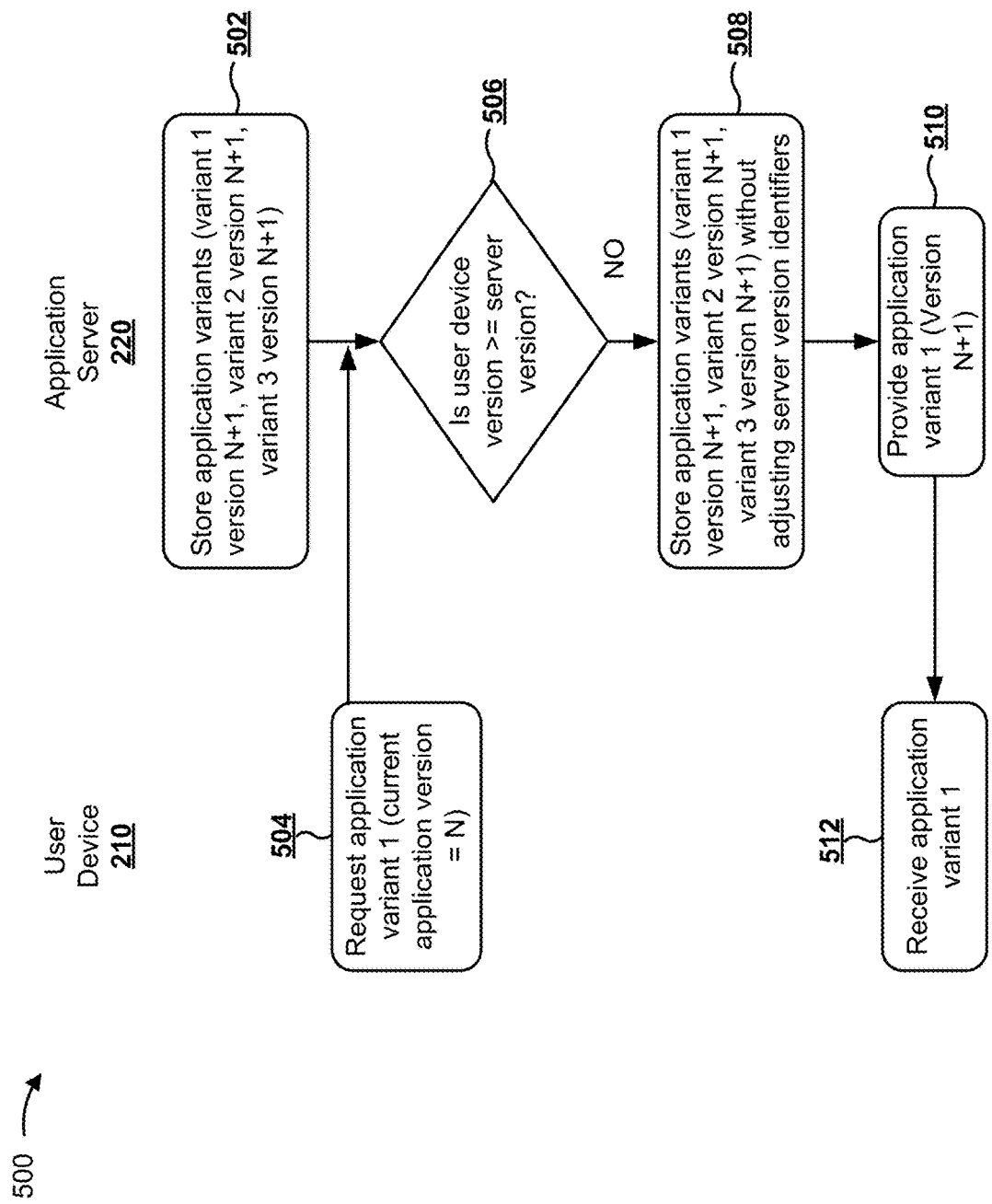
FIGS. 5A-5C are flow charts of example processes for adjusting application version identifiers based on user device requests.
Figure 5B:
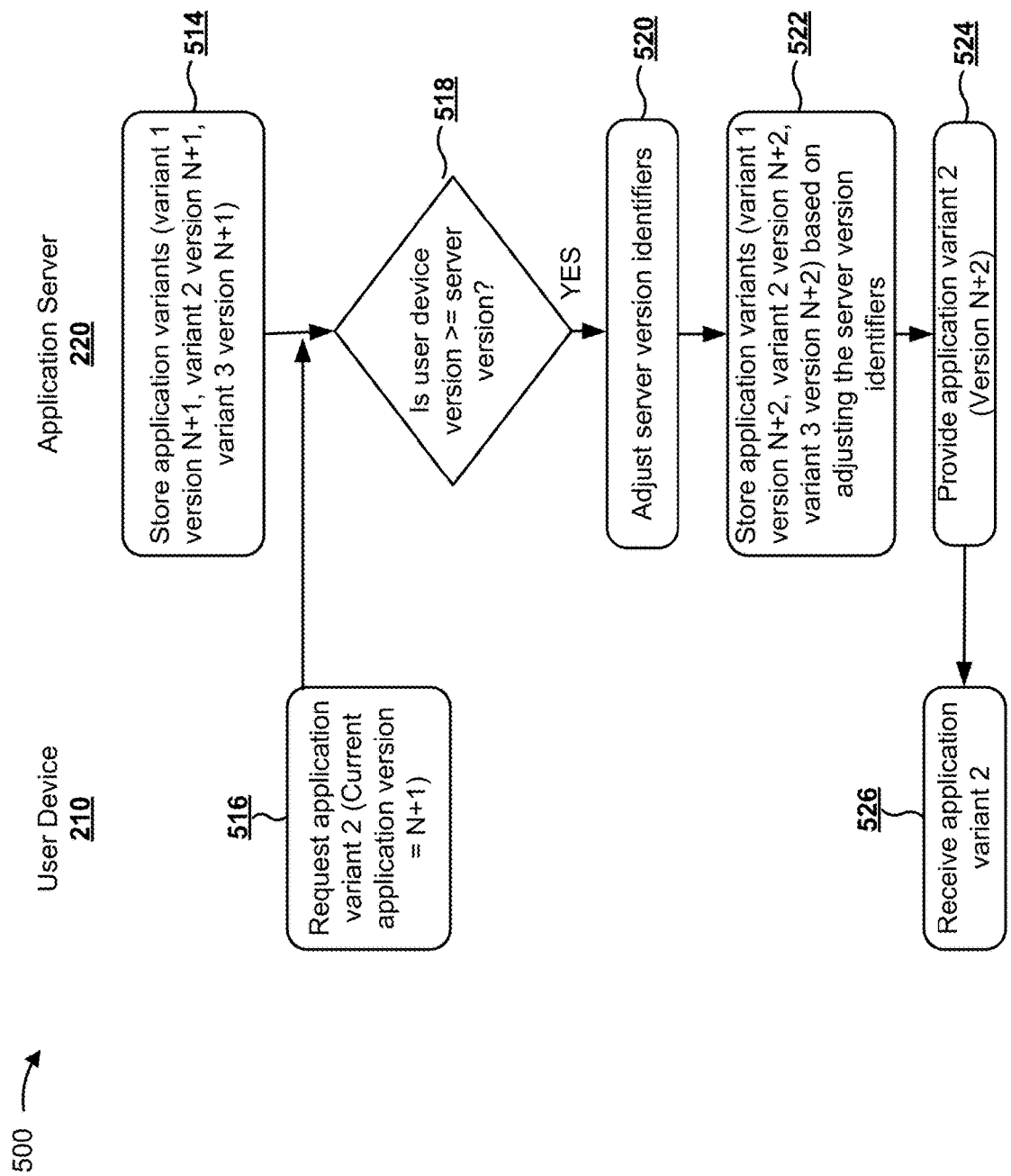
Figure 5C:
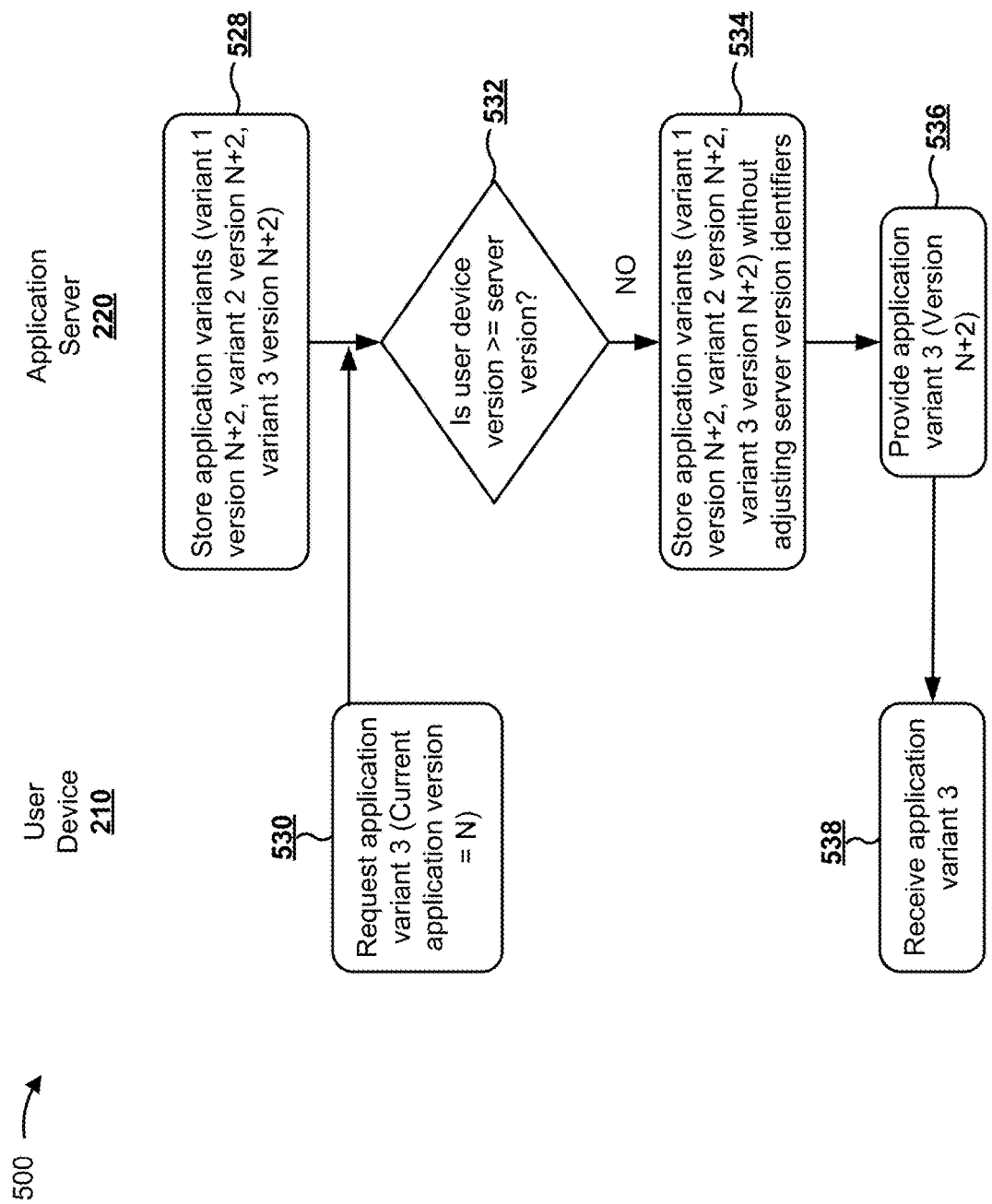

FIGS. 5A-5C are flow charts of an example process 500 for adjusting application version identifiers based on user device requests. In some implementations, one or more process blocks of FIGS. 5A-5C can be performed by user device 210 and/or application server 220.

As shown in FIG. 5A, process 500 can include storing application variants (block 502). For example, application server 220 can store multiple variants (e.g., variant 1, variant 2, and variant 3) of an application. Additionally, the multiple variants can be associated with a particular server version identifier (e.g., N+1).

As further shown in FIG. 5A, process 500 can include requesting application variant 1 (block 504). For example, user device 210 can provide, to application server 220, a request for application variant 1. In some implementations, the request can include information that identifies a user device version identifier of the application (e.g., N).

As further shown in FIG. 5A, process 500 can include determining whether a user device version identifier of the application is greater than or equal to a server version identifier of the application (block 506). For example, application server 220 can identify a user device version identifier of the application based on the request, and compare the user device version identifier of the application and the server version identifier of the application.

As further shown in FIG. 5A, if the user device version identifier is not greater than or equal to the server version identifier of the application (block 506—NO), then process can include storing application variants without adjusting server version identifiers. For example, application server 220 can prevent server version identifiers of the application from being adjusted (e.g., incremented) based on the user device version identifier not being greater than the server version identifier.

As further shown in FIG. 5A, process 500 can include providing application variant 1 (block 510). For example, application server 220 can provide, to user device 210, application variant 1 to permit user device 210 to install application variant 1. In some implementations, application variant 1 can be associated with a particular version (e.g., N+1).

As further shown in FIG. 5A, process 500 can include receiving application variant 1 (block 512). For example, user device 210 can receive, from application server 220, application variant 1, and install application variant 1 (e.g., based on the application version identifier N+1 being greater than a previously installed version identifier N).

As shown in FIG. 5B, process 500 can include storing application variants (block 514). For example, application server 220 can store multiple application variants that are associated with a particular server version identifier (e.g., version N+1). For example, the server version identifiers can be the same as shown in FIG. 5A (e.g., because the server version identifiers were not adjusted).

As shown in FIG. 5B, process 500 can include requesting application variant 2 (block 516). For example, user device 210 (e.g., a same user device 210 as shown in FIG. 5A or a different user device 210) can provide, to application server 220, a request for application variant 2. In some implementations, the request can include information that identifies a user device version identifier of the application (e.g., N+1).

As further shown in FIG. 5B, process 500 can include determining whether the user device version identifier is greater than or equal to a server version identifier of the application (block 518). For example, application server 220 can receive the request, identify the user device version identifier, and compare the user device version identifier and a server version identifier of the application.

As further shown in FIG. 5B, if the user device version identifier is greater than or equal to the server version identifier (block 518—YES), then process 500 can include adjusting server version identifiers (block 520). In some implementations, application server 220 can un-compress an archive file of the requested variant, and identify a set of files associated with the application (e.g., a manifest file, a set of executable files, a set of resource files, etc.). Additionally, or alternatively, application server 220 can decompile the manifest file to identify source code associated with the manifest file, parse the source code, identify a version identifier of the application, and adjust the version identifier of the application. For example, application server 220 can adjust the version identifier of the application such that the version identifier is greater than the user device version identifier of the application. Additionally, or alternatively, application server 220 can adjust server version identifiers of each variant of the application that is stored by application server 220.

As further shown in FIG. 5B, process 500 can include storing application variants based on adjusting the server version identifiers (block 522). For example, application server 220 can store the multiple variants of the application based on adjusting the server version identifiers of the application variants. For example, as shown, each application variant can be associated with an adjusted version identifier (e.g., N+2).

As further shown in FIG. 5B, process 500 can include providing application variant 2 (block 524). For example, application server 220 can provide, to user device 210, application variant 2.

As further shown in FIG. 5B, process 500 can include receiving application variant 2 (block 526). For example, user device 210 can receive application variant 2, and install application variant 2 (e.g., based on the version identifier N+2 being greater than the previously installed version identifier N+1 of the application).

As shown in FIG. 5C, process 500 can include storing application variants (block 528). For example, application server 220 can store multiple application variants that are associated with a particular server version identifier (e.g., version N+2). For example, the server version identifiers can be the same as the adjusted version identifiers in FIG. 5B.

As further shown in FIG. 5C, process 500 can include requesting application variant 3 (block 530). For example, user device 210 can provide, to application server 220, a request for application variant 3. In some implementations, the request can include information that identifies a user device version identifier of the application (e.g., N).

As further shown in FIG. 5C, process 500 can include determining whether the user device version identifier is greater than or equal to a server version identifier of the application (block 532). For example, application server 220 can receive the request, identify the user device version identifier, and compare the user device version identifier and a server version identifier of the application.

As further shown in FIG. 5C, if the user device version identifier is not greater than or equal to the server version identifier (block 532—NO), then process 500 can include storing application variants without adjusting server version identifiers (block 534). For example, application server 220 can store the multiple variants of the application without adjusting the server version identifiers of the application variants. For example, as shown, each application variant can be associated with version identifier N+2.

As further shown in FIG. 5C, process 500 can include providing application variant 3 (block 536). For example, application server 220 can provide, to user device 210, application variant 3.

As further shown in FIG. 5C, process 500 can include receiving application variant 3 (block 538). For example, user device 210 can receive application variant 3, and install application variant 3 (e.g., based on the version identifier N+2 being greater than the previously installed version identifier N of the application).

Although FIGS. 5A-5C shows example blocks of process 500, in some implementations, process 500 can include additional blocks, fewer blocks, different blocks, or differently arranged blocks than those depicted in FIGS. 5A-5C. Additionally, or alternatively, two or more of the blocks of process 500 can be performed in parallel.

In this way, implementations described herein enable a user device to iteratively install an application that includes a set of features that more accurately aligns with a user preference (e.g., does not include undesired features, does not include features that are beyond an operating ability of the user, etc.). Additionally, in this way, implementations described herein conserve memory resources of the user device by storing an amount of information that corresponds to the selected features rather than storing information associated with an entire application. As a result, a file size of the application can be reduced based on the number of selected features, thereby conserving processor and/or memory resources of the user device.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors configured to:
store a plurality of archive files corresponding to a plurality of variants of an application,
a variant, of the plurality of variants, of the application including one or more features that are different from another variant, of the plurality of variants, of the application;
receive, from a user device that is associated with a first variant, of the plurality of variants, of the application, a request for a second variant, of the plurality of variants, of the application,
the first variant of the application including a first set of features and the second variant of the application including a second set of features,
the first variant of the application having a different file than the second variant of the application,
the second variant of the application including the second set of features that meet a threshold size of a storage capability of the user device, and
the request to be provided based on input that identifies the second set of features from a list of features that are available to install on the user device;
determine, based on the request, a first version identifier of the first variant of the application stored on the user device and a second version identifier of the second variant of the application stored on the device;
increment the second version identifier based on the determination;
update one or more other version identifiers associated with the second variant of the application based on the incrementing the second version identifier;
determine that the second version identifier is different than the first version identifier based on the incrementing of the second version identifier;
identify, based on the request, an archive file, from the plurality of archive files, corresponding to the second set of features and corresponding to the second variant of the application; and
provide, to the user device, the archive file based on the first version identifier and the second version identifier being different to permit the user device to install the second variant of the application,
where the one or more processors, when providing the archive file to the user device, are to:
provide the archive file to the user device to enable the user device to:
dynamically remove the first variant of the application, and
dynamically add the second set of features by iteratively installing the second variant of the application based on the storage capability of the user device.

2. The device of claim 1, where the first set of features includes at least one feature not included in the second set of features or the second set of features includes at least one feature not included in the first set of features.

3. The device of claim 1, where the one or more processors are further to:
adjust a third version identifier associated with a third variant of the application based on adjusting the second version identifier to permit the third variant of the application to be installed on the user device,
the third variant of the application including a third set of features.

4. The device of claim 1, where the one or more processors are further to:
identify a manifest file included in the archive file; and
identify the second version identifier based on the manifest file.

5. The device of claim 1, where the first variant of the application and the second variant of the application include a same application identifier.

6. The device of claim 1, where the one or more processors are further to:
identify a manifest file;
decompile the manifest file to identify source code associated with the manifest file;
parse the source code to identify the second version identifier; and
adjust the second version identifier of the application.

7. The device of claim 1, where the one or more processors are further to:
receive, from the user device, another request for the first variant of the application; and
provide, to the user device, the first variant of the application to permit the user device to install the first variant of the application.

8. A non-transitory computer-readable medium storing instructions, the instructions comprising:
one or more instructions that, when executed by one or more processors of a device, cause the one or more processors to:
store a plurality of archive files corresponding to a plurality of variants of an application,
a variant, of the plurality of variants, of the application including one or more features that are different from another variant, of the plurality of variants, of the application;
receive, from a user device that is associated with a first variant, of the plurality of variants, of the application, a request for a second variant, of the plurality of variants, of the application,
the first variant of the application including a first set of features and the second variant of the application including a second set of features,
the first variant of the application having a different file size than the second variant of the application,
the second variant of the application including the second set of features that meet a threshold size of a storage capability of the user device, and
the request to be provided based on input that identifies the second set of features from a list of features that are available to install on the user device;
determine, based on the request, a first version identifier of the first variant of the application stored on the user device and a second version identifier of the second variant of the application stored on the device;
increment the second version identifier based on the determination;
update one or more other version identifiers associated with the second variant of the application based on the incrementing the second version identifier;
determine that the second version identifier is different than the first version identifier based on the incrementing of the second version identifier;
identify, based on the request, an archive file, from the plurality of archive files, corresponding to the second set of features and corresponding to the second variant of the application; and
provide, to the user device, the archive file based on the first version identifier and the second version identifier being different to permit the user device to install the second variant of the application,
where the one or more instructions, that cause the one or more processors to provide the archive file to the user device, cause the one or more processors to:
provide the archive file to the user device to enable the user device to:
dynamically remove the first variant of the application, and
dynamically add the second set of features by iteratively installing the second variant of the application based on the storage capability of the user device.

9. The non-transitory computer-readable medium of claim 8, where the first set of features includes at least one feature not included in the second set of features or the second set of features includes at least one feature not included in the first set of features.

10. The non-transitory computer-readable medium of claim 8, where the one or more instructions, when executed by the one or more processors, further cause the one or more processors to:

adjust a third version identifier associated with a third variant of the application based on adjusting the second version identifier to permit the third variant of the application to be installed on the user device,
the third variant of the application including a third set of features.

11. The non-transitory computer-readable medium of claim 8, where the first variant of the application and the second variant of the application include a same application identifier.

12. The non-transitory computer-readable medium of claim 8, where the first variant of the application includes a first file size and the second variant of the application includes a second file size that is less than the first file size.

13. The non-transitory computer-readable medium of claim 8, where the one or more instructions, when executed by the one or more processors, further cause the one or more processors to:
identify a manifest file;
decompile the manifest file to identify source code associated with the manifest file;
parse the source code to identify the second version identifier; and
adjust the second version identifier of the application.

14. The non-transitory computer-readable medium of claim 8, where the one or more instructions, when executed by the one or more processors, further cause the one or more processors to:
receive, from the user device, another request for the first variant of the application; and
provide, to the user device, the first variant of the application to permit the user device to install the first variant of the application.

15. A method, comprising:
storing, by a device, a plurality of archive files corresponding to a plurality of variants of an application,
a variant, of the plurality of variants, of the application including one or more features that are different from another variant, of the plurality of variants, of the application;
receiving, by the device and from a user device that is associated with a first variant, of the plurality of variants, of the application, a request for a second variant, of the plurality of variants, of the application,
the first variant of the application including a first set of features and the second variant of the application including a second set of features,
the first variant of the application having a different file size than the second variant of the application,
the second variant of the application including the second set of features that meet a threshold size of a storage capability of the user device, and
the request to be provided based on input that identifies the second set of features from a list of features that are available to install on the user device;
determining, by the device and based on the request, a first version identifier of the first variant of the application stored on the user device and a second version identifier of the second variant of the application stored on the device;
incrementing, by the device, the second version identifier based on the determination;
updating, by the device, one or more other version identifiers associated with the second variant of the application based on the incrementing the second version identifier;
determining, by the device, that the second version identifier is different than the first version identifier based on the incrementing of the second version identifier;
identifying, by the device and based on the request, an archive file, from the plurality of archive files, corresponding to the second set of features and corresponding to the second variant of the application; and
providing, by the device and to the user device, the archive file based on the first version identifier and the second version identifier being different to permit the user device to install the second variant of the application
where providing the archive file to the user device comprise:
providing the archive file to the user device to enable the user device to:
dynamically remove the first variant of the application, and
dynamically add the second set of features by iteratively installing the second variant of the application based on the storage capability of the user device.

16. The method of claim 15, further comprising:
identifying a manifest file included in the archive file
adjusting the second version identifier associated with the manifest file;
compiling the manifest file based on adjusting the second version identifier; and
where providing the archive file to the user device comprises:
providing the archive file based on compiling the manifest file.

17. The method of claim 15, further comprising:
adjusting a third version identifier associated with a third variant of the application based on adjusting the second version identifier,
the third variant of the application including a third set of features.

18. The method of claim 15, where the first set of features includes at least one feature not included in the second set of features or the second set of features includes at least one feature not included in the first set of features.

19. The method of claim 15, further comprising:
receiving, from the user device, another request for the first variant of the application; and
providing, to the user device, the first variant of the application to permit the user device to install the first variant of the application.

20. The method of claim 15, further comprising:
identifying a manifest file;
decompiling the manifest file to identify source code associated with the manifest file;
parsing the source code to identify the second version identifier; and
adjusting the second version identifier of the application.

* * * * *